July 15, 1969     J. W. HULL ET AL     3,455,566

FLUID SEALING ARRANGEMENTS

Filed March 11, 1966

INVENTOR.
JOHN W. HULL
EUGENE T. RAYMOND

BY Roy Mattern Jr.

ATTORNEY

United States Patent Office 3,455,566
Patented July 15, 1969

3,455,566
FLUID SEALING ARRANGEMENTS
John W. Hull, 2004 139th Place SE., Bellevue, Wash. 98004, and Eugene T. Raymond, 6913 Bal Lake Drive, Fort Worth, Tex. 76116
Continuation-in-part of application Ser. No. 257,468, Feb. 11, 1963. This application Mar. 11, 1966, Ser. No. 533,486
Int. Cl. F16j *15/00, 9/00;* F16k *41/00*
U.S. Cl. 277—176                 1 Claim This application is a continuation-in-part of a co-pending application, Ser. No. 257,468, filed Feb. 11, 1963, and now abandoned.

This invention relates to fluid seal components and assemblies thereof installed in any fluid system components, such as hydraulic or pneumatic valves and actuators in fluid power to control systems. More particularly, the invention relates to fluid seal components which must contain working fluids within the system with utmost reliability for extended static and dynamic operating periods under all envirmonmental conditions, including those of high temperature and great pressure.

Sealing components and assemblies have always demanded much attention from all designers of hydraulic and pneumatic equipment. In aircraft the correct design of sealing components, their assembly and installation is vitally important. In comparatively small light weight, highly efficient hydraulic components, the sealing function must be excellent. If it is not, sealing malfunctions can result in serious aircraft disasters involving both human and financial losses. There are costly delays of airliners while awaiting repairs to hydraulic systems which have failed because of sealing malfunctions. Expensive missiles and associated scientific equipment must be destroyed because of the inability to control their direction after sealing malfunctions have occurred.

As the problems presented by these mishaps and in any period of design effort are solved or near solution, new performance criteria for aircraft, missiles, and machinery always seem to come around the corner, both advancing the technical and scientific requirements and increasing the stringency of the performance required of fluid sealing components once again. Operating pressures, temperatures and vibrational environments continue to become more critical. Greater environmental temperature ranges alter both the physical and chemical properties of seal components. Both pressure and temperature environmental changes often-times establish new clearances between seal components in installed assemblies, either permanently and/or on a cycling basis. Pressure variations at the higher pressure levels often distort sealing components and their associated structures and drive them into conflicting dynamic destructive inteference with one another.

As each new operating environment is encountered, past developments must necessarily be reviewed critically once again from new technical and scientific viewpoints. In this respect, this invention concerns improvements in prior seals to solve present and anticipated future problems pertaining primarily to the family group of seals, which rely on the utilization of continuous elastomeric or elastomeric-like seals, such as toroidal elastomeric O-rings as sealing components. The torus or rubber doughnut-like elastomeric seals are installed with initial compression to provide an initial seal at zero or low pressures. Upon the pressure energization of an installed sealing assembly the area of the seal which is acted upon by the system pressure must be a large area compared to the footprint area at the sealing face. In this way, the unit force developed by the system fluid acting on the seal is transformed, becoming a larger sealing footprint squeezing unit force which is much greater than the unit force developed by the system fluid acting on the sealing surface and tending to separate the seal from its sealing surface. The seal under these circumstances is serving as a unit force multiplier.

Such elastomeric seals are used in many basic installations. They perform sealing functions between longitudinally reciprocating parts, such as pistons and piston rods operating within cylinders. They are used as seals between rotating parts, such as in hydraulic pumps, motors and air compressors; and as seals between oscillating parts, such as hydraulic and pneumatic swivel joints. They are also used as both diametral and face seals in installations wherein the parts are stationary with respect to one another.

Originally, such elastomeric seals were used within grooves or cavities by themselves. As pressure and temperature requirements became either solely or together more stringent, backup rings or anti-extrusion devices were incorporated into the groove or cavity formed in one or the other of sealed members to protect the elastomeric seals from being extruded between the sealed members during their relative motion or during pulsations caused by rapidly occurring pressure variations and reversals. By eliminating this extrusion, failure due to nibbling or chewing of the elastomeric seals was reduced at least under moderate pressure differentials.

However, the continued utilization of backup rings of designs previously used with elastomeric seals proved to be insufficient to guarantee continued use of elastomeric seals under more stringent conditions being devised in tests of new hydraulic equipment and those actually occurring in tests of new aircraft and missiles. After contemplation of new specifications based on higher temperature, pressure and vibrational environments continued reliance on elastomeric seals and their assemblies was seriously questioned by designers. Tests followed and proved such elastomeric seal installations were failing in the more demanding environments in many ways, some of which had supposedly been overcome by adoption of previous backup ring developments and other improvements. Alarmingly prominent extrusion nibbling failures of elastomeric seals were observed, even though protective harder material backup rings were supposedly serving to prevent such extrusion nibbling failures. Also, these extrusion initiated failures were occurring in new places, such as at the groove diameter of the seal, a phenomenon heretofore unknown. Abrasive failures were prominent at the higher pressures. In addition, inspections of tested and operational seal assemblies indicated spiraling failures were increasing in their severity and frequency, especially in the presence of more demanding long stroke movements under high temperature, dry surface conditions. Failures of the elastomeric sealing components due to their permanent compression set after relatively short periods of time at high temperatures were observed in increasing numbers. At higher temperatures elastomeric seals were losing their elasticity, becoming relatively hard and brittle as they were being reshaped by environmental pressures to conform to the contours of sealing cavities or grooves in the sealed structures. Following their compression setting, elastomer seals soon lose their ability to seal at one or all of their mating surfaces.

Many designers at this time looked to other sealing means, believing nothing more could be done to extend the utilization of compliant forgiving elastomeric seal components and assemblies. Many metal seals were investigated and several of them were designed and tested. However, these metal seals have numerous serious disadvantages. In most lightweight compact installations the metal seal operational range is quite narrow. The metal seal must contain low viscosity fluid at high pressure without creating too high a unit pressure at the sealing surface. Such high unit pressures cause excessive friction, wear and galling of the sealing surfaces. Also in most configurations the metal sealing member is extremely delicate in structure being machined with great precision and installed with the exercise of care comparable to the handling of a watch jewel. Furthermore, any scratch on a sealing surface can destroy the sealing function of the metal seal component assembly. In addition, the grooves needed to receive the metal seal components must be made of a number of pieces so as to be completed after or while the metal seal is installed, in most designs, because the metal seal cannot be readily stretched or compressed for installation in any fixed groove. The resulting costs are very high to cover the more complicated designs, added parts, precision machining, assembly, maintenance and overhaul of metal seal installations.

Other designers assuming and knowing the difficulties of operating with metal seals, sought to improve the material used in the components of elastomeric type sealing assemblies. The elastomers, for example, were made from vinylidene fluoride hexafluoropropylene copolymer and backups were made from polytetrafluoroethylene impregnated with aluminum silicate fibers and molybdenum disulphide.

Although new materials were needed, especially at the higher temperatures, if elastomeric type sealing were to be continued, more had to be done. Closer observations made of the tested and operational sealing components, assemblies and installations collectively indicated improved control of elastomeric and elastomeric-like seals was needed, if the attributes of these seals were to be relied upon under the more demanding operational requirements. As research, designing, developing and testing guidelines for this invention, the following specific requirements were established in regard to a "controlling" seal member:

(a) It must prevent extrusion of the elastomeric O-ring and resist self extrusion.

(b) It must control the position of the elastomeric O-ring in the gland cavity so as to minimize longitudinal motion of the O-ring during cycling.

(c) It must be capable of wiping a thin film of lubricating material on the surface of the sealed member.

(d) It must control the footprint of the seal so as to cause lower unit contact force between the elastomeric O-ring and the sealed member as the system pressure increases, while at the same time causing the width of the footprint to become smaller.

(e) It must not contribute to or cause excessive compression set of the elastomeric O-ring other than that attributable to the temperature of operation and the normal O-ring squeeze.

(f) It must be capable, as necessary, of being installed in a closed integral gland cavity.

This invention concerns what was done to meet these requirements and thereby to improve these elastomeric and elastomeric-like seals, their associated components, and their assemblies as installed in more demanding fluid system environments, extending their utilization in ways previously thought to be highly improbable if not impossible. In addition, these successful improvements are found to be beneficial throughout all applications of such elastomeric-like seals wherever they are used to contain working fluids of any operating fluid system. The improvements leading to very successful sealing performances concern cooperating proportional interfaces of seal components, respective sizes of the components, and other aspects of their configurations. In respective environments, various standard sizes and types of elastomeric seals are used. However, at higher temperatures there is a departure from natural rubber or synthetic rubbers. New materials such as vinylidene fluoride hexafluoropropylene copolymer, referred to previously, are used to take advantage of their resistance to permanent compression set at high temperatures. The new materials extend the range of application of the seals but do not change their function.

Maintenance of these operational purposes of the elastomeric and elastomeric-like seals throughout a greater range of operating conditions is assured by providing an environment for them in which they are self-adjusting in various ways on a timely basis, withstanding temperature, pressure and/or vibrational caused onslaughts which formerly entrapped such elastomers resulting in their premature partial or complete destruction. As vitally important elements of these changed environments in which these elastomeric seals are assisted in encountering these stringent onslaughts and in continuing to be effective seals, there are controlling seals of multiple surfaces.

The components of such a changed environment briefly described in respect to a selected assembly of sealing components in a typical installation, comprise: at least two sealed structures, one of such structures having an annular groove with at least one biased annular side wall; an elastomeric seal placed in the annular groove and necessarily in cross section being compressed radially; and a multi-sided controlling seal of semirigid low frictional material located in the groove adjacent to each biased wall of such groove having one surface complementarily mating one biased annular side wall of the annular groove, another surface complementary mating the non-grooved sealed structure and another surface interposed to guide sufficient mass of the elastomeric seal, but not all its mass, up its ramp surface upon increases in fluid system pressures, thereby both reducing the buildup of the elastomeric seal footprint contacting area against the surface of the non-grooved sealed structure, but not eliminating it, and increasing the positiveness of the annular contact made between the controlling seal and the surface of the non-grooved sealed structure, such controlled movement of the elastomeric unit force multiplying seal both avoiding its entrapment in ways leading to its untimely nibbling and spiralling failure and increasing the sealing contact of the controlling seal.

This invention is illustrated in the drawings wherein.

Figure 3:
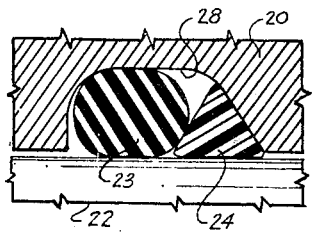
Figure 4:
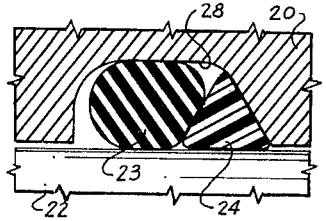
Figure 5:
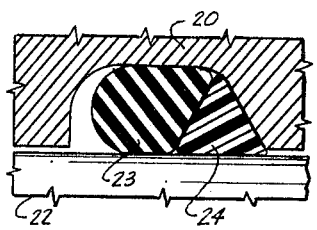
Figure 6:
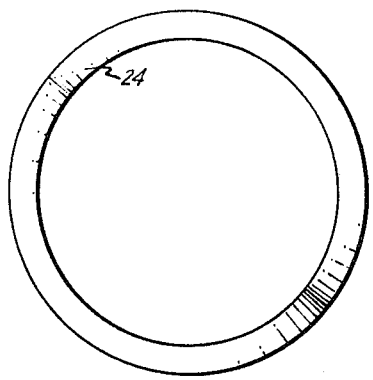
Figure 7:
Figure 8:
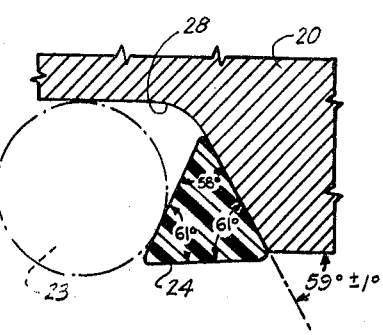
Figure 9:

FIGURES 3, 4 and 5 all show, in a partial cross sectional view sealing components as assemblied in an internal circumferential groove with the three views showing the progressive changes in cross sectional shape and overall positions of the force multiplying sealing ring: In FIGURE 3 at no pressure, in FIGURE 4 under medium pressure and in FIGURE 5 under full pressure;

FIGURES 6 and 7 illustrate, respectively, in front and side views, the controlling sealing ring for installation in internal circumferential grooves;

FIGURE 8 shows, in a cross sectional view, an internal circumferential groove structure including both the force multiplying sealing ring in dotted outline and the controlling sealing ring, initially positioned prior to the installation of a cylindrical shaft or shaft-like member (not shown);

FIGURE 9 illustrates a controlling sealing ring for installation in external circumferential grooves.

Throughout these figures, various installations of the sealing components in respective embodiments are illustrated to indicate how the improved environmental control is universally applied to any operating fluid system and the components thereof.

Figure 1:
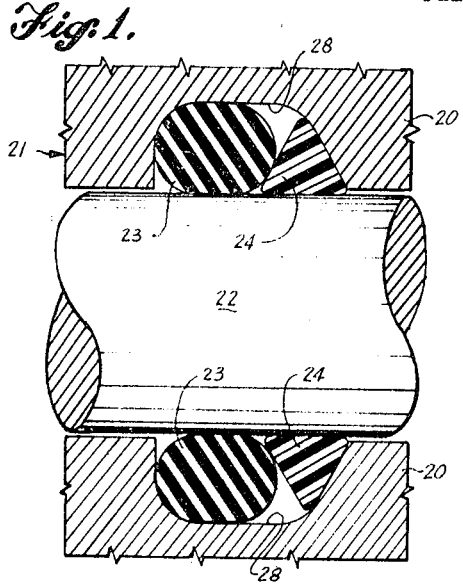
FIGURE 1 shows in a partial cross sectional view sealing components assembled and installed within an internal circumferential groove in a cylinder or cylinder-like member sealing against the outside surface of a cylindrical shaft or shaft-like member such as the piston rod of a hydraulic actuating cylinder.

In FIGURE 1, dynamic sealed member structure 21 containing working fluid of a fluid system is illustrated wherein one sealed member or structure 20 has a groove 28 arranged in its internal circumference, and the adjacent relatively moving sealed member 22 has no groove. The internal circumferential groove 28 accommodates the sealing components with some of their portions extending therefrom, the circular cross section O ring seal 23, for example, being radially compressed upon assembly approximately 15 percent. The width of the groove provides limited clearance for the sealing components. This groove width must be large enough to allow some self adjustment of the sealing components, yet it must be restrictive enough to prevent any relative slippage motion of the sealing components, causing what is commonly referred to as dead band or lost motion of actuators because of seal movements within excessive groove spaces. The internal circumferential groove in this embodiment has one side arranged on a bias for complementarily fitting one of the sealing components.

The sealing components fitted within this groove 28 are a force translational seal or otherwise called a unit force multiplying seal 23 positioned on the working fluids pressure side of the groove 28. This force translational seal 23 is made of elastomeric or elastomeric-like sealing material having a circular cross sectional configuration when relaxed, the seal being deformed upon installation to the configuration shown in FIGURE 1. Immediately adjacent to the force translating or unit force multiplying seal 23 within the groove 28 is a multi-sided seal control ring or controlling seal 24, illustrated as having an isosceles triangular cross sectional configuration.

Figure 2:
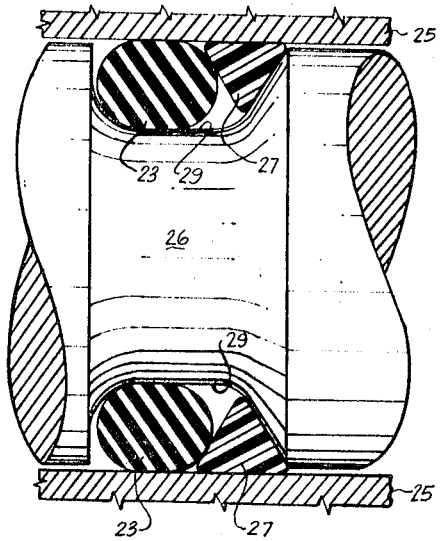
FIGURE 2 illustrates, in a partial cross sectional view, sealing components assembled and installed within an external circumferential groove in a piston or piston-like member sealing against an internal surface of a cylinder or cylinder-like member.

In FIGURE 2, the sealing components are arranged in an external groove 29 of the moving sealed member of structure 26. The seal control ring or controlling seal 27, also shown in FIGURE 9, must necessarily be of a different configuration having a dynamic sealing surface at its outer diameter in contrast to the location of the dynamic sealing surface at the inside diameter of the seal control ring or controlling seal 24, shown in FIGURE 1.

In FIGURES 3, 4 and 5 a selected portion of FIGURE 1 is repeated to show how the force translational seal or unit force multiplying seal 23 changes in cross sectional configuration from no or low pressure in FIGURE 3, at medium pressure in FIGURE 4 and upon full pressure in FIGURE 5. In FIGURE 3, this seal 23 is shown maintaining a zero pressure or low pressure seal with about a 50% footprint area. At this time the seal 23 is relatively independent of the seal control ring or controlling seal 24 except for a slight contact. However, as the fluid system pressure is applied and increased, the footprint area of seal 23 first enlarges, then returns to its original area, and thereafter reduces to a smaller area. Also, as the fluid system pressure is applied, the contact between the force translational seal or unit force multiplying seal 23 and the controlling seal or seal control ring 24 is substantially increased as shown in FIGURE 4. The variations in footprint areas of force multiplying seals 23 and the simultaneous changing in the contact areas between the two cooperating sealing components will be slightly variable in different installations, depending upon the fluid system pressures and temperatures, the relative sizes and shapes of the particular sealing components and the hardness of the elastomeric-like force multiplying seal. However, FIGURES 3, 4 and 5 indicate the general transition of both the footprint area and the adjacent sealing component contacting areas. Throughout a pressure cycle, the unit force multiplying seal 23 is guided from its low pressure position of approximately a 50% footprint area into a controlled continuing sealing operating position reducing in footprint area to approximately 20% and returned. As the fluid system pressure increases, more of the mass of the unit force multiplying seal or force translational seal 23 is guided away from the dynamic sealing surface in the direction of the resulting annular cavity in the comparatively static sealing area of the groove 28. In this position of retreat, the unit force multiplying seal 23 at extreme higher pressures has a smaller but important sealing footprint area remaining in contact with the dynamic sealing surface of the relatively moving member 22. Sealing of seal control ring or controlling seal 24 can occur, as the unit forces translated through the utilization of seal 23 and applied across the bias construction of the seal control ring 24, are effective in driving the seal control ring or controlling seal 24 into higher unit force contact with the relatively moving sealed member 22 and with the biased side or wall of the groove 28. This close adherence of the controlling seal 24 both to the groove 28 and to seal member 22 results in the complete elimination of any potential extrusion gaps at static or dynamic locations into which geometrically changing portions of the force multiplying seal 23 possibly could be extruded, nibbled and chewed, causing its untimely destruction and the resulting failure of the sealing assembly and the ensuing faulty operation of the fluid pressure system.

FIGURES 6, 7 and 8 illustrate in more detail the controlling seal 24 which is used in installations similar to those shown in FIGURES 1, 3, 4 and 5, wherein the inside surface of the seal control ring is in contact with the sealed member. FIGURE 9 is an end view of the seal control ring or controlling seal 24 wherein its outside surface is in contact with the sealed member as in FIGURE 2.

At this point in the description, for purposes of further clarification of the relative proportions of these illustrated fluid sealing arrangements, the specific dimensions of one installation follow. On a tactical fighter aircraft, in a main landing gear door and speed brake hydraulic actuator assembly of the hydraulic landing gear control system, the groove in the piston rod gland seal of diameter 1.998 is: .186 in depth; .407 wide at the entrance; .300 wide at its back; one side on the pressure side is perpendicular; the other side is slanted at 59°±1°; and a radius of .090 is used at each end of the back width in the transition from the respective sides to the back width. In the groove of these dimensions, the force multiplying seal (O-ring) has a cross sectional diameter of .210. The controlling seal has a cross section which is triangular being .178 long on each side. The base angles at the extremities of the dynamic sealing surface side are 61°. The apex of each angle is modified by a maximum .005 flat formed edge. No concavity on the dynamic sealing side is allowed. Manufacturing tolerances permit, however, on the other two sides "concavity up to .004 per .10 inch of side." The corresponding depth dimension of the controlling seal is comparable with the cross sectional diameter of the force multiplying seal.

With the dimensions of the controlling seals 24 chosen so that they correspond to the torus diameter and cross section diameter relationships used in United States Military Standard O-rings (per AN 6227 and MS 28775), and corresponding cylinder bore, piston rod, and seal groove diameters (such as per MIL-P-5514) are used, excellent low-friction materials such as polytetrafluoroethylene (even though semi-rigid) can be used for said controlling seals and they will function completely satisfactorily in the continuous-ring configuration. No expansion or contraction joints are needed. Because the fluid pressure causes the force translation seal to act against its beveled sidewall, the seal control ring 24 expands or contracts as necessary to always maintain intimate sealing contact with the relatively moving sealed member.

This independence of an expansion or contraction joint is a most important advantage of this design since, with a continuous ring controlling seal, no extrusion gaps (even of the most minor size into which the force multiplying seal could easily extrude under pressure at high temperature) are allowed. Also, with said continuous-ring controlling seal, there are no leak paths for escape of some fluid which may leak past the force multiplying seal such as when its sealing footprint is at the minimum.

For some sealed component assemblies, however, the installation of controlling seals in the continuous-ring configuration may be rather difficult and it is necessary to use a split-ring configuration which is installed into the seal groove. For these instances, a simple scarf cut is made at an angle. This need for some cutting angularity is to avoid a straight through leakage or blow out path. Also such a scarf cut is made with a cutting tool of minimum thickness, resulting in a razor like cut, so that after installation the control seal 24 or 27 will appear to be a continuous integral part. Extreme pointed ends resulting from such a scarf cut would be damaged and should be avoided.

In FIGURE 8 some size and position angles are indicated as being representative of how the specific geometry is related with respect to the cross sectional structure of the controlling seal 24 and the angularity of the biased side or wall of the groove 28. Utilization of the angles indicated will assure there will always be contact between the controlling seal or seal control ring 24 and the relatively moving sealed member 22 upon its insertion. Furthermore, this established initial and remaining contact is immediately adjacent to O-ring or force translational seal. Therefore there is no clearance gap into which this O-ring or unit force multiplying seal can be trapped and damaged.

There is also another very important reason why an angular difference is used, as illustrated in FIGURE 8. In a new installation where none of the parts have been run in, a high unit force between the edge of the seal control ring facing the O-ring and the sealed member will cause a thin film of the material of the seal control ring to be deposited on the sealed member. This occurs at relatively low pressure if the contact area between these two surfaces is a line instead of the entire width of the face of the seal control ring in contact with the sealed member. Since the seal control ring will in all cases be made from a material with a coefficient of friction considerably lower than that of the elastomer of the O-ring, this film serves to assist in the control of spiral failures by reducing the forces that can cause the circumferentially local rolling action of the O-ring cavity.

This thin film deposit advantage coupled with the advantages of a reduction in footprint width or area and with the increase in the O-ring contact with both the stationary gland cavity surfaces and control ring surfaces, all are cumulative in eliminating any unwanted rolling action of the O-ring either in whole or in part as relative movement of the sealed member and O-ring occurs.

The net result is that at high pressures, the seal control ring provides one and one-half times the surface area in resistance to toroidal rolling of the O-ring and less than one-half the O-ring area in contact with the sealed member than is experienced, for example, with the rectangular cross section anti-extrusion rings. This means that the forces tending to cause spiral failures are less than one third and that the effect of gland cavity abrasion on the surface of the O-ring not in contact with the sealed member is substantially reduced since the O-ring will not roll within the cavity.

Sealed member 22 is not shown in FIGURE 8 to illustrate more clearly the lack of parallelism between the sealing face of the controlling seal 24 and the inside surface of the sealed member 20, and accordingly the lack of parallelism between the same sealing face of the controlling seal 24 and the external dynamic sealing surface of the sealed member 22 to be inserted. Specification and tolerance controls over these angles of construction are deemed necessary in view of very demanding operating conditions.

This illustrated and desecribed relationship of the control seal ring's corner angle to the bias angle of the seal groove is very important to asure the overall reliable functioning of the seal arrangement. At high temperatures, especially, it is extremely important that all possible extrusion gaps be closed. If they are not closed, then the force multiplying seal (O-ring) which approaches a viscous fluid state, will extrude into any gap. Such extrusion immediately results in nibbling failures which soon cause complete failure of the seal. In aircraft, loss of the seal becomes loss of the hydraulic system. Then there is a likelihood of the catastrophic loss of an aircraft and its passengers.

The respective sizes of the sealing components should be reasonably comparable as previously described. The dimension of the controlling seal perpendicular to the dynamic sealing surface should be substantial and almost equal to the like orientated dimension of the force multiplier seal. Being so sized, controlling seal will always serve its controlling function and there never will be any danger of its own extrusion between the sealed members. Also, because of these proportions, there is an initial limited clearance which is necessarily near or at a part-to-part contact across the groove which avoid any lost motion of actuators and other components that otherwise would occur, because of initial seal movements within excessively wide groove spaces. Such lost motion is referred to as the dead band effect.

In the respective embodiments, the sealing components, the force multiplying seal and the controlling seal always perform in their cooperative manner. As the controlling seal is set upon its function of directing the geometric modification of the cross sectional area of the force multiplying seal, it simultaneously receives a greater share of the modified unit forces transmitted by the force multiplying seal. The resultant of these modified unit forces, when considered in respect to its force vectors causes the controlling seal to improve and increase its contact force with the other non-grooved sealed member and also with the adjacent wall or side of the groove in its own associated seal member. Such contact force along these two surfaces continues through all movements, pulsations and vibrations at times when the deformable materials of the force multiplying seal might otherwise extrude between such surfaces, resulting in their serious entrapment leading to nibbling, chewing and the untimely failure of the force translational seal and the entire sealing component assembly. There is no opportunity for any entrapment occuring between the sealed members or between the seal control ring and the non-grooved sealed member because at all times when extrusion into such a gap might otherwise occur, the gap is never accessible because the unit force multiplying seal or force translational seal itself, modifying and transferring the unit forces, drives the seal control ring or controlling seal into continuous contact with the non-grooved sealed member, Also, there is no opportunity for an extrusion gap to form at the inside diameter of the groove, because the seal control ring is driven by the force translational seal into firm contact with the groove side blocking any extrusion path of this unit force multiplying seal or force translational seal.

Where there is extensive relative linear movement between the sealed members under conditions wherein the sliding contact between the force translational seal 23 and the non-grooved adjacent sealed member could possibly be irregular throughout the seal 23 circumference resulting in its spiralling, the seal control ring is instrumental in limiting such irregularity of the sliding contact to a negligible minimum. As shown in FIGURES 3, 4 and 5, the controlled geometric movement of the force multiplying seal mass, upon pressure increases, into the cavity located remotely from the dynamic sealing surfaces, keeps the continuing footprint area of the seal 23 and its associated unit forces to non-self-destructive values. This effective control is essentially needed when hot and dry dynamic sliding sealing surface conditions prevail.

Although dimensions and sizes have been previously set forth in regard to a specific installation, it is deemed advisable to again indicate the comparative size relationships of all the seal components which underlie the success of any selected installation. Underlying their selection, there is a constant awareness of the cross section sizes in proportion to overall diameters to allow controlled expansion and contraction of continuous rings.

At present, all control rings and gland cavities are sized proportionally to the dimensions of certain standardized elastomeric O-rings used in commercial and military aircraft. If an O-ring of significantly smaller or larger cross section is installed in any installation, as illustrated in FIGURES 1 and 2, without resizing the gland cavity and the seal control ring, the concept of this invention is no longer the same and, in all probability, the seal installation will fail in one way or another. Therefore, it is important to note that the gland cavity *must always be proportional* to the free cross sectional diameter of the O-ring portion of the assembly and the height of the Control Ring *must always be proportional* to the cavity depth, which is the annular distance between the the sealed member and the concentric opposing diameter of the gland cavity. For different applications the control ring height will fall between 70% and 100% of the cavity depth. The normal condition being approximately 85% for assemblies where the cavity depth is approximately 85% of the free cross sectional diameter of the O-ring. If the cavity depth is smaller than 85% of the O-ring free cross sectional diameter, then the control ring height should approach 100% of the cavity depth. If the cavity depth is larger than 85% of the O-ring free cross sectional diameter, then the control ring height should approach 70% of the cavity depth.

By maintaining these relationships the footprint of the O-ring in contact with the sealed member will always be maintained at more than 20% and less than 40% of the free cross sectional diameter of the O-ring at system pressures of 3000 p.s.i. and above. If the footprint falls below 20% of the O-ring free cross sectional diameter there is a good probability of leakage past the seal control ring. If it increases above 40% there is a possibility of the O-ring spiraling in the gland cavity.

Nominally the included angle of the cone of the gland cavity and of the face or faces of the control ring is 120°. This angle can be made nominally larger in installations where it is desired to reduce seal friction or nominally smaller in installations where a higher force component of the seal control ring against the sealed member is desired. This included angle, however, should not be varied by more than 20° in either direction or the O-ring footprint cannot be maintained by adjusting the previously mentioned proportions of the gland cavity and the seal control ring. In all cases, however, as noted previously, it is necessary to have the angle of the cavity slightly different from the angle of the seal control ring so as to insure first contact of the seal control ring with the sealed member and with the gland cavity at the points of closest proximity to the O-ring.

The sealing components, assemblies and installations, illustrated and described, successfully contain working fluids in systems operating at pressures as high as 4,000 pounds per square inch and at temperatures in the neighborhood of 600° F. Their utilization has extended the elastomeric-like seal technology far beyond the operational ranges originally thought possible. The assembled sealing components in their installations meet the more demanding operational requirements because the geometrical changes of the elastomeric-like seals are excellently controlled. Such control avoids any of the possible causes of their premature destruction. Their life is prolonged to continuously accomplish their dual purpose of continuously sealing and unit force multiplying or force modifying in conjunction with the adjacent controlling rings. The controlling rings continuously and cooperatively serve their dual purpose of actively participating in the geometrical control of the elastomeric-like primary seal controlling it so that it remains in continuous contact with the adjacent sealed surface under all pressures and temperatures and of maintaining their higher pressure sealing contact with the dynamic sealing surface as they continuously are in a position to receive the unit forces multiplied or modified by the elastomeric or elastomeric-like seal. Through the relationship of these assisting and direct functions of both the force multiplying seal and the control seal, the overall sealing functions of these two insertable sealing components in conjunction with their surrounding groove structure assembly are extremely effective in maintaining reliable seals over a greater range of pressure, temperature and other stringent environmental requirements.

We claim:

1. A sealing assembly for sealing an annular clearance space between surfaces of first and second rigid members, said first member having an annular groove of predetermined depth and width, at least one end of said groove being formed by a conical surface, a continuous elastic annular deformable force translational seal squeezed radially between the bottom of said groove and the surface of said second rigid member, and a continuous non-split semi-rigid annular seal control ring in said groove positioned between said annular deformable force translational seal and said conical surface, said seal control ring being of essentially triangular cross section and having one face in contact with said conical surface, a second face in contact with the adjacent surface of said second member and a third face in contact with said force translational seal, the angle between the faces of said seal control ring engaging the conical groove wall and the surface of said second rigid member is slightly greater than the angle between said conical groove wall and the face of said second rigid member whereby the unit contact pressure is increased in the corner of the seal control ring adjacent to the elastic force translational seal insuring that the edge of the semi-rigid seal control ring adjacent to the elastic force translational seal will from the outset of assembly and operation remain in contact with the surface of the second rigid member, said seal control ring extending in a direction away from rigid second member into said groove essentially to the bottom thereof, the cross-sectional areas of said groove, said force translational seal and said seal control ring being so related that, in the absence of a fluid presure differential across the assembly, there is a clearance between said force translational seal and at least a portion of the adjacent end wall of said groove and a portion of the facing conical face of said seal control ring, and, with a positive fluid pressure differential across the assembly from the side opposite the seal control ring, said force translational seal is displaced in the direction of said conical surface of said groove to urge said seal control ring along said conical surface of said groove in the direction of said second rigid member and into tight intimate engagement with the surface of said second rigid member to thereby prevent extrusion of said force translational seal into the annular clearance between said first and second rigid members, the portion of said seal control ring adjacent to the bottom of said groove also being in tight intimate contact with said conical surface of said groove to thereby prevent extrusion of said force translational seal into any gaps existing between said seal control ring and said groove, and with the space bounded by the surfaces of said first and second rigid members adjacent to said force translational seal and said seal control ring, under any condition of fluid pressure differential, or lack thereof, across the assembly from the side opposite said seal control ring, being insufficient to permit movement of said force translational seal completely away from the surface of said second rigid member thereby maintaining said force translational seal in intimate sealing contact with said first and second rigid members at all times.

References Cited

UNITED STATES PATENTS

| | | | |
|---|---|---|---|
| 2,420,104 | 5/1947 | Smith | 277—176 |
| 2,739,855 | 3/1956 | Bruning | 277—188 |
| 2,932,535 | 4/1960 | Peckii et al. | 277—152 X |
| 2,973,978 | 3/1961 | Oppenheim | 277—188 |
| 2,998,987 | 9/1961 | Taschenberg et al. | 277—153 X |
| 3,097,855 | 7/1963 | Allen | 277—188 |
| 3,132,869 | 5/1964 | Campbell | 277—188 |
| 3,166,832 | 1/1965 | Scannell | 277—188 X |

SAMUEL ROTHBERG, Primary Examiner

U.S. Cl. X.R.

277—177, 188